Aug. 28, 1945.   F. KRICKLER   2,383,554
FORCE MEASURING DEVICE
Filed Feb. 23, 1944

INVENTOR.
FRANK KRICKLER
BY
ATTORNEY

Patented Aug. 28, 1945

2,383,554

UNITED STATES PATENT OFFICE 2,383,554

FORCE MEASURING DEVICE

Frank Krickler, Cleveland, Ohio, assignor to Curtiss-Wright Corporation, a corporation of Delaware Application February 23, 1944, Serial No. 523,774

10 Claims. (Cl. 73—133)

This invention relates to a force measuring device which, although not necessarily limited to such use, is characterized by features which adapt it particularly for measuring the forces which must be applied to the control stick of an airplane to operate the control surfaces to which the said stick is connected.

In the design of the control system of an airplane, the calculated values of the aerodynamic forces to which the control surfaces will be subjected, and hence the forces which will be transmitted to the control stick, may vary in substantial degree from the actual values. It is the practice, therefore, to check such calculated values by measuring, under actual flight conditions, the forces which must be applied to the control stick to effect such movement of the control surfaces as may be necessary to move the latter to, and hold them in, various positions against the action of the aerodynamic forces which tend to restore such surfaces to their neutral positions.

One object of the invention is to provide a device which may be availed of to measure accurately and directly the forces which are applied to the control stick of an airplane under actual conditions of flight, this object contemplating a device which is so designed and which is adapted to be associated with the control stick in such a manner that, regardless of their direction, it will measure and indicate all forces which are applied to the control stick.

A further object is a device wherein provision is made for compensating for variable factors which might otherwise impair the accuracy of the measurements.

A still further object is to provide a device which is in the form of an attachment and which may be applied to, and detached from, the control stick of an airplane with facility.

The device, indicated at 5, is shown in connection with a control stick 6 by which a pilot may control the elevator and ailerons of an airplane, it being understood that such illustration is intended by way of example only and that the device may be availed of to equal advantage for measuring forces which must be applied to levers to effect the actuation of various kinds of lever-controlled members.

Figure 1:
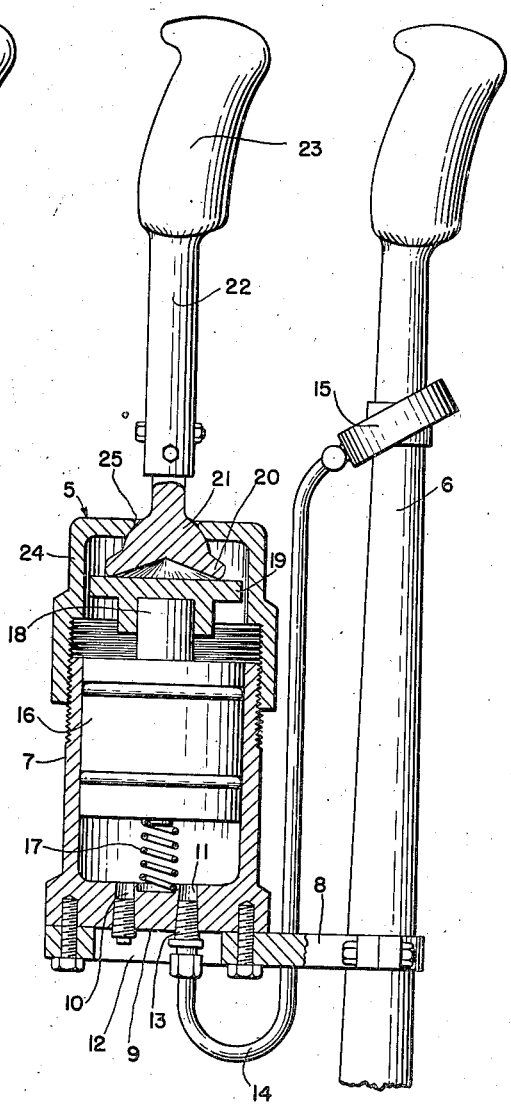
Figure 1 is a sectional view of a device embodying the features of the invention, the device being shown applied as an attachment to a conventional control stick.

As illustrated in Figure 1, the device includes a cylinder 7 which is mounted upon the control stick by a bracket 8. The lower section of the cylinder 7 is adapted to contain a body of hydraulic fluid, the bottom wall 9 being formed with outlet ports 10 and 11 which are accessible through an opening 12 in the bracket 8. The port 10 is provided for drainage purposes, being closed by a suitable plug. A fitting 13 which screws into the port 11, connects one end of a tube 14 to the lower end of the cylinder 7, the other end of the said tube being connected to a suitable pressure-responsive gauge 15. The latter may be graduated in any suitable units and degrees.

A piston 16, which may, as shown, carry conventional sealing rings, occupies the cylinder 7, being located above the body of hydraulic fluid in the latter and being normally held in a retracted position by said fluid and by a spring 17 which seats in a recess in the bottom wall of the cylinder and which fits over a projection on the under side of the piston. An axially extending neck 18 on the upper end of the piston 16 carries a head 19. The upper face of the latter provides a seat for a flaring, annular flange 20 formed on a hemispherical element 21 which is carried by, and at, the lower end of a lever 22, the upper end of the lever carrying a handgrip 23 which corresponds in shape and elevation to the handgrip on the control stick 6. The flange on the element 21 is held seated on the head 19 by a cap-piece 24 which screws onto the threaded upper end of the cylinder 7, the top wall of the said cap-piece being formed with an opening 25 through which the lever 22 extends and in which the upper rounded portion of the element 21 is accommodated for universal movement.

It will be noted that the spring 17 and the hydraulic fluid in the lower section of the cylinder 7 normally hold the piston 16 at the upper limit illustrated, in which position the rounded upper side of the element 21 engages the annular seat provided by the wall surrounding the opening 25. The parts are so designed that when they occupy the positions described the piston 16, neck 18 thereof, head 19 and the center about which the element 21 may rock are all located in axial alignment.

In order to determine the forces which must be applied to the control stick 6 in the operation of the airplane, the said stick is controlled by applying such forces directly to the lever 22 of the measuring device. In other words all movements of the control stick are effected by manipulating the lever of the measuring device. It will be apparent that in the use of the latter in the manner and for the purpose described, the lever 22 will be rocked in the direction in which it is urged, as it is manipulated to move the control stick 6, to thereby cause the flange 20 of the element 21 to effect a movement of the piston 16 axially in a direction which will apply pressure to the hydraulic fluid in the cylinder 7. Such rocking movement of the lever 22 is relative to the control stick 6. The pressure which is produced by the rocking movement of the lever 22 and which is indicated upon the gauge 15, is dependent upon the magnitude of the relative movement of the lever 22 and this in turn is dependent upon the amount of force which must be applied to the latter to effect the desired movement of the control stick 6. In this connection it will be noted that the universal mounting of the lever 22 in the manner described has the advantage that any force which is applied to it will be accurately measured and indicated upon the gauge 15 regardless of the direction in which such force is applied to the lever. The concavity which is formed in the under side of the element 21, whereby the flange 20 has what is in effect a line contact with the head 19 has the advantage that, preventing adhesion between the element 21 and cap-piece 19, it renders the device more sensitive than would be the case if substantial areas of these two elements were in contact with one another in the neutral position of the lever 22.

Figure 2:
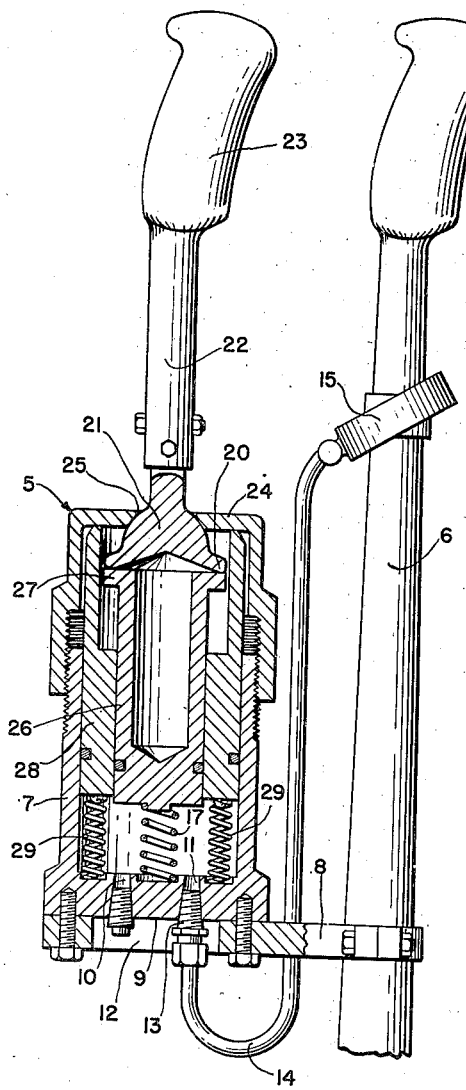
Figure 2 is a similar view of a modified form of device.

A modified form of device is illustrated in Figure 2. In this embodiment, the piston 26 which is actuated by the lever 22 of the device is tubular, having a head at its lower end upon which the spring 17 acts and a flange 27 at its upper end which is engageable with the flange on the element 21. The piston 26, therefore, is actuated by the lever 22 in response to the forces which are applied to it in exactly the same manner as the piston 16 of the embodiment of the invention first described. The piston 26, however, is movable in a sleeve 28 which is likewise movable in the cylinder 7, springs 29 which act upon the lower end of the sleeve serving to hold the upper end against the top wall of the cap-piece 24. In this embodiment the area of the piston head is substantially less than that of the piston 16. Hence the device is more sensitive, it being noted in this connection when the cap-piece 24 is screwed further onto the cylinder 7 it moves the piston 26 and sleeve 28 as a unit. When it is unscrewed, the two parts are in this case also moved as a unit, the piston 26 by the spring 17 and the sleeve 28 by the springs 29.

From the foregoing it will be apparent that in body embodiments described the cap-piece 24 of the cylinder 7 may be adjusted to compensate for any variations in the volume of the hydraulic fluid in the cylinder which may occur as a result of leakage, temperature variations or otherwise. In the use of the device, the cap-piece may be initially adjusted so that any desired gauge reading may be obtained for a "zero" stick load. In the event that the reading for such "zero" stick load is positive, then such reading must be subtracted from each final reading to obtain the actual stick load.

Although the device is illustrated as an attachment which is applied to a conventional form of control stick it will be understood that the invention also contemplates the incorporation of the device in, and as a permanent part of, a control stick. In such case the combined control stick and force measuring device would be substituted for the control stick of the plane during the tests. This would have the advantage that it would enable more accurate measurements than could otherwise be obtained without taking into consideration, and compensating for, the actual weight of the device.

I claim as my invention:

1. A device for measuring the force applied to a universally-mounted control member to move the latter to a predetermined position, said device including a cylinder which is carried by said member and which contains a body of hydraulic fluid, a piston in said cylinder, a universally mounted lever carried by said cylinder to which said force is applied, said lever being movable relatively to said control member in a direction and to a degree which correspond to the direction and amount of force required to move said control member to said position, means responsive to the relative movement of said lever for actuating said piston to apply pressure to said fluid, and an indicator responsive to such pressure.

2. A device for measuring the force applied to a universally-mounted control member to move the latter to a predetermined position, said device including a cylinder which is carried by said member and which contains a body of hydraulic fluid, a piston in said cylinder, a universally mounted lever carried by said cylinder to which said force is applied, means connecting said lever and piston, whereby any pivotal movement of the former effects an axial movement of the latter to apply pressure to said fluid, and an indicator responsive to such pressure.

3. A device for measuring the force applied to a universally-mounted control member to move the latter to a predetermined position, said device including a cylinder which is carried by said member and which contains a body of hydraulic fluid, means for applying a predetermined initial pressure to said fluid, a piston in said cylinder, a universally mounted lever carried by said cylinder and to which said force is applied, means connecting said lever and piston, whereby any pivotal movement of the former effects an axial movement of the latter to apply additional pressure to said fluid, an indicator responsive to said pressures, and resilient means for restoring said piston to its original position when said lever is released.

4. A device for measuring the force applied to a control member, to move the latter to a predetermined position, said device including a cylinder which is carried by said member and which contains a body of hydraulic fluid, a piston in said cylinder, a cap-piece on said cylinder, said cap-piece being longitudinally adjustable to apply a predetermined initial pressure to said fluid, a pivotally-mounted lever carried by said cylinder and to which said force is applied, means connecting said lever and piston, whereby any pivotal movement of the former effects an axial movement of the latter to apply additional pressure to said fluid, and an indicator responsive to said pressures.

5. A device for measuring the force applied to a control member to move the latter to a predetermined position, said device including a cylinder which is carried by said member and which contains a body of hydraulic fluid, a piston in said cylinder, said piston having a head, a cap-piece on said cylinder, said cap-piece being formed with an opening, a lever having one end which extends through said opening, a hemispherical element carried by said lever and which seats on said head, the wall of said opening cooperating with said element to permit universal movement of said lever, whereby any pivotal movement of said lever effects an axial movement of said piston to apply pressure to said fluid, and an indicator responsive to said pressure.

6. A device for measuring the force applied to a control member to move the latter to a predetermined position, said device including a cylinder which is carried by said member and which contains a body of hydraulic fluid, a piston in said cylinder, said piston having a head, a cap-piece on said cylinder, said cap-piece being formed with an opening and being adjustable to apply a predetermined initial pressure to said fluid, a lever having one end which extends through said opening, a hemispherical element carried by said lever which seats on said head, the walls of said opening cooperating with said element to permit universal movement of said lever, whereby any pivotal movement of said lever effects an axial movement of said piston to apply an additional pressure to said fluid, an indicator responsive to said pressures, and resilient means for restoring said piston to its original position when said lever is released.

7. A device for measuring the force applied to a control member to move the latter to a predetermined position, said device including a cylinder which is carried by said member and which contains a body of hydraulic fluid, a sleeve in said cylinder, a piston in said sleeve, a pivotally mounted lever carried by said cylinder, means for longitudinally adjusting said sleeve with respect to said fluid, means connecting said lever and piston, whereby any pivotal movement of the former effects an axial movement of the latter to apply pressure to said fluid, and an indicator responsive to said pressure.

8. A device for measuring the force applied to a control member to move the latter to a predetermined position, said device including a cylinder which is carried by said member and which contains a body of hydraulic fluid, a cap-piece on said cylinder, a sleeve in said cylinder, a piston in said sleeve, a pivotally mounted lever carried by said cylinder, said cap-piece being adjustable to vary the positions of said sleeve and piston with respect to said fluid, means connecting said lever and piston, whereby any pivotal movement of the former effects an axial movement of the latter to apply pressure to said fluid, and an indicator responsive to said pressure.

9. A device for measuring the force applied to a control lever mounted for universal movement about a main pivot, comprising a second lever mounted for limited universal movement about a secondary pivot, said secondary pivot being in a fixed position with respect to and moving with said control lever, and the axes of said levers being so alined that a force applied to said second lever will tend to move said control lever in the same direction, means for resisting universal movement of said second lever, and means for measuring the force resisting movement of said second lever about its universal mounting when it reaches a value substantially equal to the force necessary to move said control lever about its universal mounting.

10. A device for measuring the force applied to a control lever mounted for universal movement about a main pivot, comprising a second lever mounted for limited universal movement about a secondary pivot, said secondary pivot being in a fixed position with respect to and moving with said control lever, and the angles between the axes of said levers in the normal or inactive position being substantially zero so that a force applied to said second lever will tend to move said control lever in the same direction, means for resisting universal movement of said second lever, and means for measuring the force resisting movement of said second lever about its universal mounting when it reaches a value substantially equal to the force necessary to move said control lever about its universal mounting.

FRANK KRICKLER.